United States Patent
Kalman et al.

(10) Patent No.: US 8,967,205 B2
(45) Date of Patent: Mar. 3, 2015

(54) ANTI-EXTRUSION LAYER WITH NON-INTERLOCKED GAP CONTROLLED HOOP STRENGTH LAYER

(75) Inventors: Mark Kalman, Houston, TX (US); Liang Yu, Katy, TX (US)

(73) Assignee: DeepFlex Inc., Houston, TX (US)

(*) Notice: Subject to any disclaimer, the term of this patent is extended or adjusted under 35 U.S.C. 154(b) by 1099 days.

(21) Appl. No.: 12/726,234

(22) Filed: Mar. 17, 2010

(65) Prior Publication Data

US 2011/0226374 A1 Sep. 22, 2011

(51) Int. Cl.
*F16L 11/24* (2006.01)
*F16L 11/08* (2006.01)

(52) U.S. Cl.
CPC .................................. *F16L 11/083* (2013.01)
USPC ........................................................ 138/134

(58) Field of Classification Search
CPC ... F16L 11/081–11/083; F16L 11/085–11/088
USPC .......................................... 138/134, 129, 150
See application file for complete search history.

(56) References Cited

U.S. PATENT DOCUMENTS

| | | | |
|---|---|---|---|
| 5,261,462 A | 11/1993 | Wolfe et al. | |
| 5,730,188 A * | 3/1998 | Kalman et al. | 138/135 |
| 6,110,550 A * | 8/2000 | Jarrin et al. | 428/36.91 |
| 6,145,546 A * | 11/2000 | Hardy et al. | 138/136 |
| 6,363,974 B1 * | 4/2002 | Perez et al. | 138/130 |
| 6,401,760 B2 * | 6/2002 | Espinasse | 138/135 |
| 6,446,672 B1 * | 9/2002 | Kalman et al. | 138/127 |
| 6,491,779 B1 | 12/2002 | Bryant | |
| 6,550,502 B2 * | 4/2003 | Odru | 138/135 |
| 6,769,454 B2 * | 8/2004 | Fraser et al. | 138/127 |
| 6,804,942 B2 | 10/2004 | Bryant | |
| 6,843,278 B2 * | 1/2005 | Espinasse | 138/134 |
| 7,055,551 B2 * | 6/2006 | Fraser et al. | 138/132 |
| 7,069,955 B2 * | 7/2006 | Glejbol et al. | 138/135 |
| 7,082,998 B2 * | 8/2006 | Zamora et al. | 166/384 |
| 7,124,780 B2 * | 10/2006 | Dupoiron | 138/134 |
| 7,254,933 B2 | 8/2007 | Bryant | |
| 7,318,454 B2 * | 1/2008 | Dupoiron | 138/135 |
| 7,445,030 B2 * | 11/2008 | Hardy et al. | 138/135 |

(Continued)

FOREIGN PATENT DOCUMENTS

| JP | 08-247348 A | 9/1996 |
|---|---|---|
| JP | 11-090972 A | 4/1999 |
| JP | 2002-013675 A | 1/2002 |

OTHER PUBLICATIONS

International Preliminary Report on Patentability Issued in PCT Application No. PCT/US2011/021511, Dated Sep. 27, 2012 (8 Pages).

(Continued)

*Primary Examiner* — J. Casimer Jacyna
(74) *Attorney, Agent, or Firm* — Osha Liang LLP (57) ABSTRACT

In one aspect, the present disclosure relates to a tubular assembly with gap control. Embodiments disclosed herein relate to one or more embodiments of and methods for controlling gaps between helically wrapped layers in a pipe structure. A tubular assembly includes a fluid barrier, a first layer, and a second layer comprising a plurality of non-interlocking helical wraps and disposed on an outer surface of the first layer, in which the first layer is disposed between the fluid barrier and the second layer and configured to at least partially displace into a space created between adjacent non-interlocking helical wraps of the second layer.

20 Claims, 5 Drawing Sheets

(56) References Cited

U.S. PATENT DOCUMENTS

| | | | |
|---|---|---|---|
| 7,530,372 B2 * | 5/2009 | Gerez et al. | 138/134 |
| 7,762,344 B2 * | 7/2010 | Courville et al. | 166/387 |
| 7,770,603 B2 * | 8/2010 | Hardy | 138/134 |
| 7,891,384 B2 * | 2/2011 | Binet et al. | 138/135 |
| 7,946,313 B2 * | 5/2011 | Vo | 138/135 |
| 8,006,773 B2 * | 8/2011 | Courville et al. | 166/387 |
| 8,210,212 B2 * | 7/2012 | Buchner | 138/134 |
| 8,276,620 B2 * | 10/2012 | Vo | 138/135 |
| 8,353,316 B2 * | 1/2013 | Do | 138/134 |
| 2001/0003992 A1 * | 6/2001 | Espinasse | 138/135 |
| 2002/0014271 A1 | 2/2002 | Bruno | |
| 2003/0178082 A1 | 9/2003 | Yamaguchi et al. | |
| 2003/0183293 A1 | 10/2003 | Fraser | |
| 2004/0094222 A1 | 5/2004 | Bateman et al. | |
| 2004/0099324 A1 | 5/2004 | Fraser et al. | |
| 2004/0221907 A1 | 11/2004 | Glejbol et al. | |
| 2005/0229991 A1 | 10/2005 | Hardy et al. | |
| 2006/0191311 A1 * | 8/2006 | Fraser et al. | 72/368 |
| 2008/0145583 A1 | 6/2008 | Bryant | |
| 2010/0146768 A1 * | 6/2010 | Sheldrake | 29/450 |
| 2011/0162750 A1 * | 7/2011 | Marchand | 138/134 |

OTHER PUBLICATIONS

Notification of Transmittal, International Search Report and Written Opinion for Application No. PCT/US2011/021511 mailed Sep. 30, 2011 (12 pages).

"Specification for Unbonded Flexible Pipe"; ANSI/API Specification 17J, Third Edition; American Petroleum Institute; Jul. 2008 (86 pages).

* cited by examiner

ANTI-EXTRUSION LAYER WITH NON-INTERLOCKED GAP CONTROLLED HOOP STRENGTH LAYER

BACKGROUND OF THE DISCLOSURE

1. Field of the Disclosure

The present disclosure relates to flexible composite pipe for conducting petroleum or other fluids offshore or on land and a method of controlling gaps within the same.

2. Description of the Related Art

A composite flexible pipe may be formed, in part, from composite tape stacks of laminated tape strips. The composite tape stacks may be helically wound onto a pipe to provide structure and support. Gaps may form between adjacent wrappings of the tape stacks, which may allow for blow through of a fluid barrier or layer that may be beneath the wrappings. However, advantageously, the gaps may provide flexibility to the wrapped layers so that there may be relative movement or spacing between adjacent layers, thereby allowing the pipe to bend and/or flex. Therefore, control over the gaps may be desired so as to prevent blow through of a fluid barrier, but allow flexibility in the pipe.

In traditional steel pipes, which may be flexible pipes, interlocking layers or wrappings may be employed to control the blow through and provide gap control. This is particularly prevalent in high-pressure applications, where pressure armor may be employed to provide resistance to internal and external pressure and mechanical crushing loads. The pressure armor may include interlocked metallic hoop strength layers and gaps may be controlled by only allowing a maximum separation between adjacent wraps to be the full extension of interlocked wraps. Furthermore, an internal pressure sheath material may be able to span the gap under a high internal pressure loading, thereby allowing some flexibility to the pipe, but also preventing blow through of the internal pressure sheath.

However, in the design of some flexible pipes, which may employ composite materials for reinforcement layers, and, particularly, flexible fiber reinforced pipe, there may be no interlocking layers. As such, gap control may be difficult to achieve effectively.

SUMMARY OF INVENTION

In one aspect, the present disclosure relates to a tubular assembly with gap control. Embodiments disclosed herein relate to one or more embodiments of and methods for controlling gaps between helically wrapped layers in a pipe structure. A tubular assembly includes a fluid barrier, a first layer, and a second layer comprising a plurality of non-interlocking helical wraps and disposed on an outer surface of the first layer, in which the first layer is disposed between the fluid barrier and the second layer and configured to at least partially displace into a space created between adjacent non-interlocking helical wraps of the second layer. The helically wrapped layers may include composite tape stacks.

In another aspect, the present disclosure relates to a method to control gaps between adjacent non-interlocking helical wraps disposed on a tubular member. The method includes installing a control layer between a curved outer surface of the tubular member and the non-interlocking helical wraps, in which the control layer is configured to at least partially displace between the adjacent non-interlocking helical wraps from underneath the wraps.

BRIEF DESCRIPTION OF DRAWINGS

Features of the present disclosure will become more apparent from the following description in conjunction with the accompanying drawings.

FIG. 4A is a top view, FIG. 4B is a cross-sectional view.

DETAILED DESCRIPTION

A control layer and method of controlling gaps of a non-interlocking helically wrapped layer of a flexible pipe in accordance with one or more embodiments will be described herein with reference to the accompanying drawings.

Figure 1:
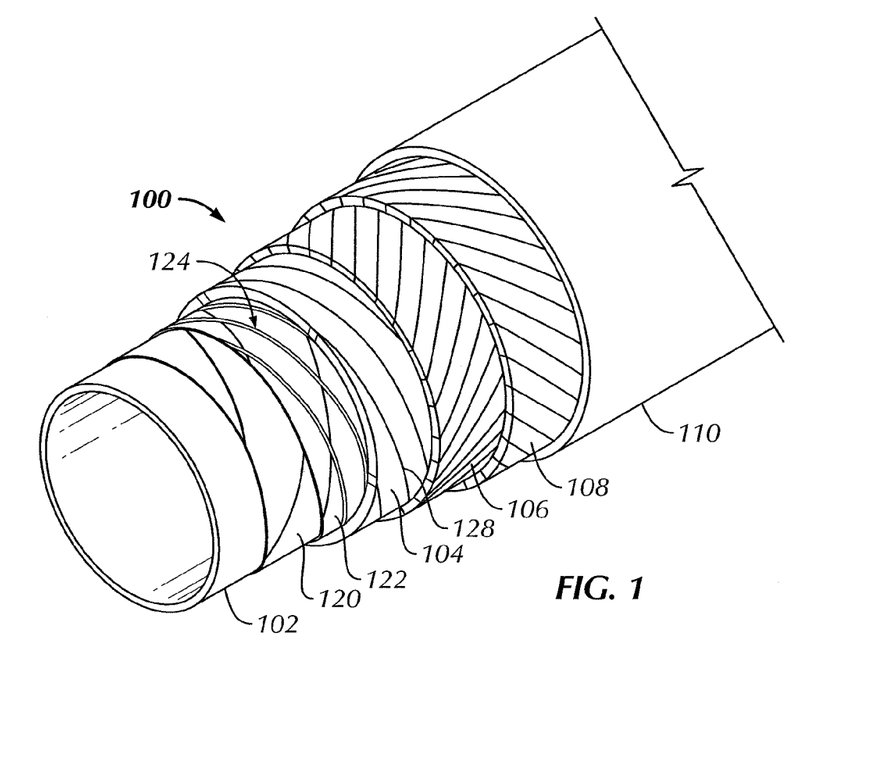
FIG. 1 shows an isometric view of a composite flexible pipe in accordance with one or more embodiments of the present disclosure.

Referring to FIG. 1, an isometric view of a composite fiber reinforced flexible pipe 100 is shown. A fluid barrier (or liner or internal pressure sheath) 102 may be wrapped with a hoop reinforcement layer 104, tensile layers 106 and 108, and may be sealed, covered, and/or protected by a jacket (or outer sheath) 110. Further, an anti-extrusion layer may be included between the fluid barrier 102 and the hoop reinforcement layer 104. The anti-extrusion layer may include multiple layers and/or wrappings 120 and 122 of an anti-extrusion material, such as fiber reinforced tape, polymers, and/or any other pressure resistant material known in the art. Further, those skilled in the art will appreciate that composite flexible pipe 100 may be made of different and/or additional layers including perforated cores, collapse resistant hoop layers, anti-wear layers, lubricating layers, tensile layers, membranes, burst resistant hoop layers, perforated jackets, and/or any other additional layers, or combinations thereof, without deviating from the scope of the present disclosure.

In certain embodiments, hoop reinforcement layer 104 may be made from laminated tape stacks such as that disclosed in U.S. Pat. No. 6,491,779, filed on Apr. 24, 2000, entitled "Method of Forming a Composite Tubular Assembly," U.S. Pat. No. 6,804,942, filed on Sep. 27, 2002, entitled "Composite Tubular Assembly and Method of Forming Same," U.S. Pat. No. 7,254,933, filed on May 6, 2005, entitled "Anti-collapse System and Method of Manufacture," and U.S. Patent Application Publication No. 2008/0145583, filed on Dec. 18, 2006, entitled "Free Venting Pipe and Method of Manufacture," all of which are hereby incorporated by reference in their entireties.

Hoop reinforcement layer 104 may be wound at any "lay angle" relative to the longitudinal axis of fluid barrier 102, in which higher lay angles may provide relatively high hoop strength and lower lay angles may provide relatively high axial strength. However, in accordance with one or more embodiments of the present disclosure, hoop reinforcement layer 104 may be wound at a relatively high lay angle relative to the longitudinal axis of the pipe, for example 60° to 89°, to provide internal pressure resistance against burst and/or external pressure resistance against collapse or crushing due to external loads. As noted, hoop reinforcement layer 104 may be made from stacks of tape, which may include fibers of glass fiber, aramid, carbon, and/or any other fiber used in composite structural materials.

Figure 2:
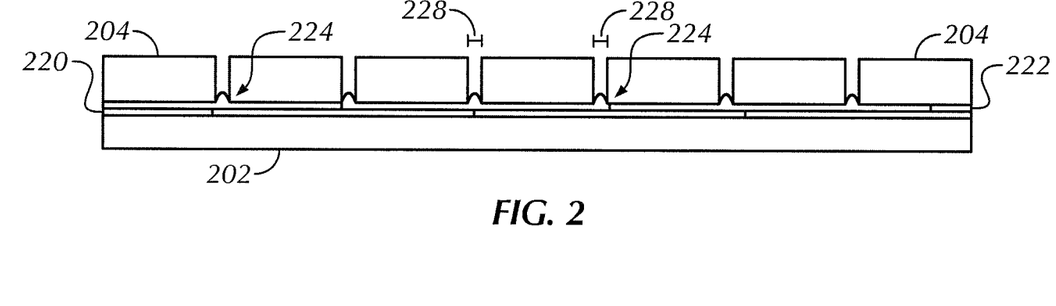
FIG. 2 is a cross-sectional view of a composite flexible pipe in accordance with one or more embodiments of the present disclosure.

Further, those skilled in the art will appreciate that the hoop reinforcement layer 104 may be made from steel wire which may be helically wound at a high lay angle to provide hoop strength. The steel wire may be rectangular or any other shape that may allow for a high lay angle. Additionally, although only one hoop strength layer 104 is shown in FIG. 2, those skilled in the art will appreciate that multiple layers or wrappings of hoop reinforcement to provide additional burst, collapse, or crushing resistance may be applied to a pipe without deviating from the scope of the present disclosure. Furthermore, superimposed hoop strength layers may be counter-wound, such that, for example, one layer may be wound clockwise and a next layer may be wound counter-clockwise, so as to provide and/or improve torsion balance within the pipe.

Hoop reinforcement layers 104 may have gaps 128 formed between adjacent wrappings of the layer. Gap 128 may result from imperfect installation, particularly if 100% coverage of a liner or other previously applied layer is desired and/or attempted to be achieved. Alternatively, gaps 128 may be intentionally produced, so as to allow for flexibility within pipe 100.

Further, as shown in FIG. 1, anti-extrusion layers 120 and 122 may be applied to a pipe structure to prevent fluid barrier 102 from entering gaps 128 and to prevent blow-through of fluid barrier 102. Multiple layers may be applied so that stronger blow through resistance is achieved. As the blow through resistance (i.e., layers 120 and 122, and any additional layers) is increased, gap 128 may be increased in size, thereby allowing more flexibility. However, a larger gap 128 may increase the likelihood of blow-through of fluid barrier 102.

Further, although only two anti-extrusion layers between fluid barrier 102 and hoop reinforcement layer 104 are shown in FIG. 1, those skilled in the art will appreciate alternative structures may be used without deviating from the scope of the present disclosure. For example, additional anti-extrusion layers, in accordance with one or more embodiments of the present disclosure, or other anti-extrusion layers and/or lubricating layers, may be applied between two hoop strength layers and/or between any superimposed, adjacent, and/or sequentially wrapped layers. For example, an anti-extrusion layer such as that disclosed in U.S. Patent Application Publication No. 2008/0145583 may be applied, or a lubricating layer and/or anti-wear layer described in American Petroleum Institute Specifications 17J and 17B, which are hereby incorporated in their entireties, may be applied. Further, more than one layer may be wrapped and/or applied between consecutive pipe structure layers, thereby providing a stronger anti-extrusion layer. Furthermore, in one or more embodiments, one or more layers of the flexible pipe 100 may be unbonded to one another.

During the manufacture and operation of pipe 100, control of gaps 128 between adjacent wrappings of a helically wrapped layer may be desired. Gaps 128 may allow for appropriate spacing between adjacent wrappings so that the pipe may flex and/or bend, without damaging the pipe structure. As noted above, a composite flexible pipe may be made without interlocking adjacent wraps, and therefore an alternative gap control system and/or method may be necessary.

Referring again to FIG. 1, anti-extrusion layers 120 and 122 may provide gap control. A first layer 120 may be helically wrapped around fluid barrier 102. A second layer 122 may be helically wrapped around the first layer 120, but second layer 122 may be wrapped with an offset from first layer 120, such that the gaps between adjacent wraps of first layer 120 may be covered by second layer 122. Further, second layer 122 may, at least partially, be made of a material that may allow for at least part of second layer 122 to displace between adjacent wraps of hoop layer 104 which may be wrapped over second layer 122.

The displaced material of second layer 122 may form a filler 124, which may be displaced bedding material (as described below). As shown in FIG. 1, filler 124 may fill gaps 128 that form between adjacent wrappings of hoop layer 104. Accordingly, filler 124 may form as a counter-wound raised surface of second layer 122, as shown in FIG. 1. Filler 124 may provide gap control between the wrappings of hoop layer 104.

As shown in FIG. 1, the first and second anti-extrusion layers 120 and 122 may be made of rectangular cross section tape that may be helically wound around fluid barrier 102. Anti-extrusion layers 120 and 122 may be reinforced with uniaxial or woven fibers that may provide tensile and/or lateral strength and may be twisted and/or woven (see FIGS. 4A-4C). Furthermore, cross fibers may be woven perpendicular to the uniaxial fibers to provide additional strength and/or support.

The reinforcement fibers of anti-extrusion layers 120 and 122 may be made from glass fiber, aramid, carbon, metallic fibers, and/or any other fibrous materials known in the art. The reinforcement fibers may be short fibers or long chopped fibers embedded in a polymer matrix, so as to provide appropriate reinforcement to the anti-extrusion layers.

Moreover, although shown as two wrappings of a tape, anti-extrusion layers 120 and 122 may be a single anti-extrusion layer, such as a single tape wrapping, a sleeve, or an extruded layer or may be more than two wrappings, sleeves, and/or layers or combinations thereof without deviating from the scope of the present disclosure.

Furthermore, second layer 122 may include a low modulus bedding material, allowing for a low stress concentration in second layer 122 at the edge of gaps 128 in hoop layer 104. Fillers 124 of anti-extrusion layer 122 may form because of the bedding material, and/or bedding layer, of anti-extrusion layer 122. The bedding material may be a polymeric material, and, more particularly, may be an elastomeric material, for example, elastomers and other materials used in bonded flexible pipe. Furthermore, the bedding material, used to form the fillers, may include a foam material to allow for greater displacement and/or expansion.

Alternatively, in accordance with one or more embodiments of the present disclosure the elastomeric material, which may cover any reinforcement fibers, may be made of a swellable material, such as that disclosed in U.S. Patent Application Publication No. 2008/0093086, filed on Oct. 19, 2007, entitled "Swellable Packer Construction for Continuous or Segmented Tubing," which is hereby incorporated by reference in its entirety. The swellable material may swell in the presence of water or other moisture, thereby expanding and displacing between adjacent wraps in layer 104 and forming fillers 124. During manufacture, after a swellable anti-extrusion layer may be applied, and a hoop layer may be wrapped over the anti-extrusion layer, the pipe may be conveyed through a fluid bath and/or high humidity zone, thereby swelling the anti-extrusion layer 122 and forming fillers 124.

Alternatively, in accordance with one or more embodiments of the present disclosure, the fillers may be created by interaction between the surface of the anti-extrusion layer and a layer that may be helically wrapped thereupon. Referring to FIG. 2, a cross-sectional view of a pipe section in accordance with one or more embodiments of the present disclosure will be discussed. Anti-extrusion layers, first layer 220 and second layer 222, may be wrapped around a fluid barrier 202. Further, hoop strength wrappings 204 may form a hoop strength layer of a pipe helically wrapped over the anti-extrusion layers 220 and 222. The top anti-extrusion layer 222 may be made of a material which may allow it to displace into gaps 228 between adjacent wrappings 204 of the hoop strength layer, such as elastomers used in the manufacturing of bonded flexible pipe. Accordingly, fillers 224 may form and may provide gap control between wrappings 204 of the hoop strength layer. Filler 224 may form as a ridge or nub and fill (or displace) between wrappings 204, thereby preventing adjacent wrappings 204 from impacting or getting too close, thereby preventing too much rigidity in the pipe and preventing high alternating stress in the hoop strength layer when the pipe is subject to repetitive bending. Further, as filler 224 may form in each gap 228 between each wrapping 204, it may also prevent adjacent wraps 204 from separating too much, and therefore may provide blow-through prevention. Accordingly, gaps 228 may be controlled.

Figure 5:
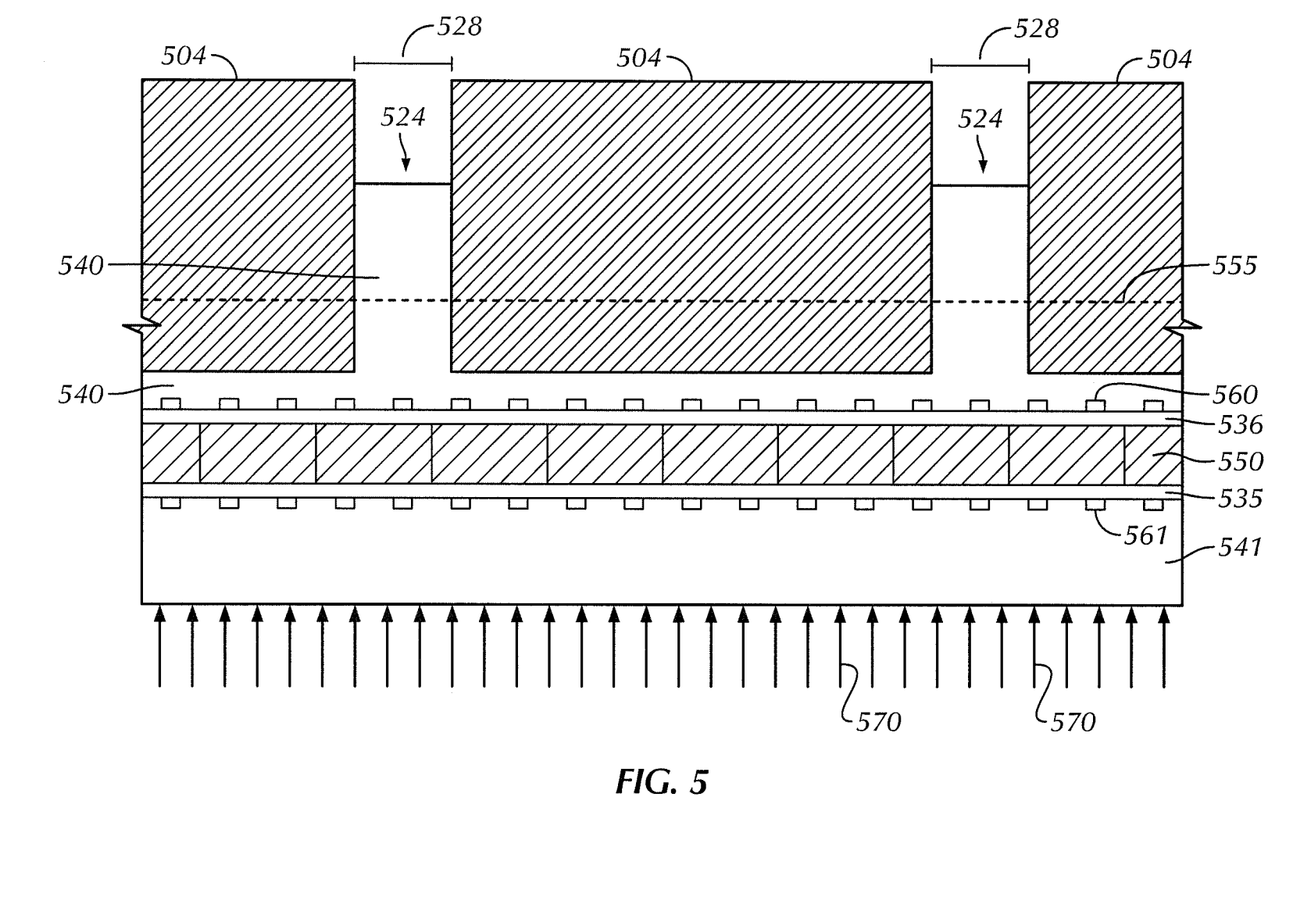
FIG. 5 is a cross-section view of a portion of a composite flexible pipe in accordance with one or more embodiments of the present disclosure.

In one or more embodiments of the present disclosure, wrappings 204 of a hoop strength layer may be wound on the underlying anti-extrusion layer 222 with an interference fit (see FIG. 5). Accordingly, the inner wrapping diameter of wrappings 204 may be smaller than an outer diameter of anti-extrusion layer 222. For example, the interference fit between the two layers 204 and 222 may be 0.010 to 0.030 inches, such that the outer diameter of anti-extrusion layer 222 may be 0.010 to 0.030 inches larger than an inner diameter of wrapping 204. Accordingly, wrappings 204 may impact and/or press into anti-extrusion layer 222 by an amount in that range. Those skilled in the art will appreciate that other interference fits outside of that range may be used without deviating from the scope of the present invention and the stated range is merely provided as an example. Furthermore, the amount of interference may depend, at least partially, on the thickness of the anti-extrusion layer.

As noted above, and discussed below, anti-extrusion layer 222 may have a bedding surface as an outer surface, which may be the contact surface between anti-extrusion layer 222 and wrappings 204. Accordingly, due to the interference fit, wrappings 204 may squeeze and/or press into the bedding surface. As a result, the material of the bedding surface may displace into gaps 228 formed between adjacent wrappings 204. The displacement may occur as a result of the wrappings 204 pressing into the bedding material, and displacing the pressed material into gaps 228 between adjacent wrappings 204, thereby forming fillers 224. Fillers 224 may, therefore, control the gaps between adjacent wrappings 204.

To control gaps 228, fillers 224 may prevent wrappings 204 from moving axially relative to the fluid barrier and may maintain gaps 228 between adjacent wrappings 204. Wrappings 204 may, therefore, be held in approximately the same position in which they were installed, even during spooling, subsequent manufacturing operations, installation, and/or service.

As anti-extrusion layer 222 may be made with a reinforced elastomer that may allow for the formation of fillers 224, wrappings 204 may be applied with minimal force, even with the interference fit, and thereby prevent damage to the fluid barrier during manufacture. Therefore, excessive force, collapse and/or shrinking of the fluid barrier and high pre-stress in the hoop strength layer may be avoided.

Now referring to FIG. 3, a cross-sectional view of a pipe section in accordance with one or more embodiments of the present disclosure will be discussed. A single anti-extrusion layer 326 may be wrapped around a fluid barrier 302. Accordingly, anti-extrusion layer 326 may be a single layer which may allow for displacement between adjacent wrappings 304. Fillers 324 may form between adjacent wrappings 304 in gaps 328, and thereby provide gap control, as discussed above. Further anti-extrusion layer 326 may be a reinforced structure, where the reinforcement may be provided by fibers 330 within anti-extrusion layer 326.

Figure 3:
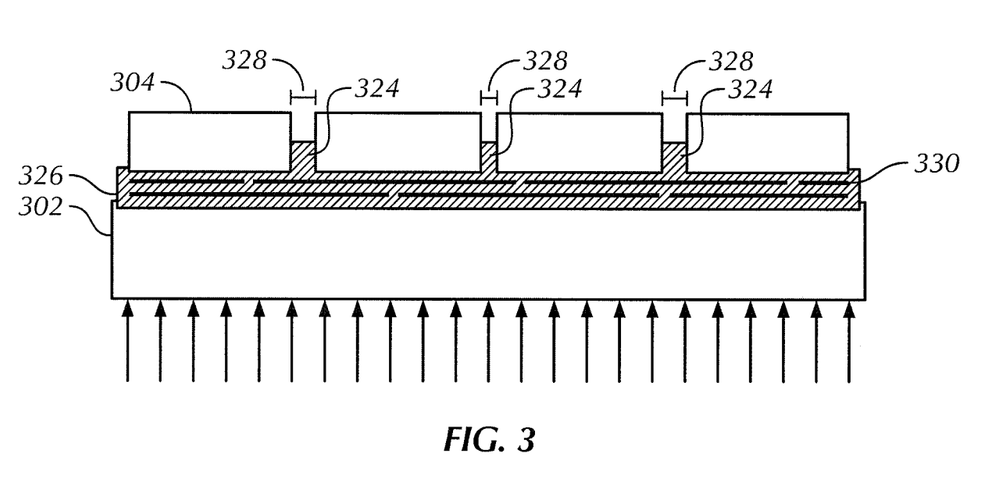
FIG. 3 is a cross-sectional view of a composite flexible pipe in accordance with one or more embodiments of the present disclosure.

Further, as shown in FIG. 3, pressure (arrows of FIG. 3) may be applied from beneath fluid barrier 302. Under normal conditions, without a gap control mechanism in accordance with one or more embodiments of the present disclosure, the pressure may tend to push fluid barrier 302 radially outward and into gaps 328. Further, as a pipe is manufactured, stored, transported, installed, and/or used in service, the pipe may be wound, bent, and/or manipulated, thereby allowing gaps 328 to fluctuate in size. For example, the wrappings 304 may shift and/or slide relative to each other and relative to a surface of the fluid barrier 302. As such, the gaps 328 may increase in size between some wrappings 304, and decrease in size between other wrappings 304. Accordingly, the amount of free space that may be in a particular gap 328 may become large, and when pressure may be applied through the pipe, the radial pressure within fluid barrier 302 may become large enough, and gap 328 may be weak enough (due to its large width), so that blow through of the fluid barrier may occur. Further, if gaps 328 are removed by shifting and/or moving of wraps 304, regions or sections of the pipe may lose flexibility and/or cause damage to a pipe if forced to bend.

Therefore, according to one or more embodiments of the present disclosure, an anti-extrusion layer 326 may be applied between fluid barrier 302 and wrappings 304. Anti-extrusion layer 326 may displace between adjacent wrappings 304, thereby preventing relative movement and/or sliding of the wraps. Accordingly, gap 328 may be controlled and maintained at a desired width so as to prevent increases in the size of gap 328, thereby preventing blow through of fluid barrier 302. Further, gap 328 may be controlled so that the size of gap 328 may not decrease in size, thereby maintaining flexibility within the pipe.

Figure 4A:
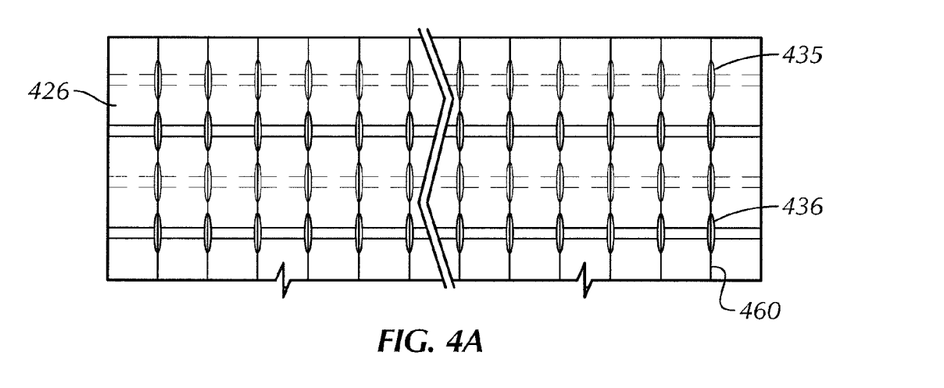

Now referring to FIG. 4A, a top view of a gap control layer in accordance with one or more embodiments of the present disclosure will be described. Gap control layer 426 may be a reinforced tape. However, as noted above, the gap control layer may alternatively be a sleeve or extruded layer, with or without reinforcements. Fibers 435 and 436 may be threaded through gap control layer 426 to provide reinforcement and structure. The threading may be parallel to the direction of the tape, or may be perpendicular thereto, or may be a combination thereof, or may be oriented at any angle between. Accordingly, a matrix structure may be formed, with cross-weaving of reinforcement fibers 435 and 436.

Figure 4B:
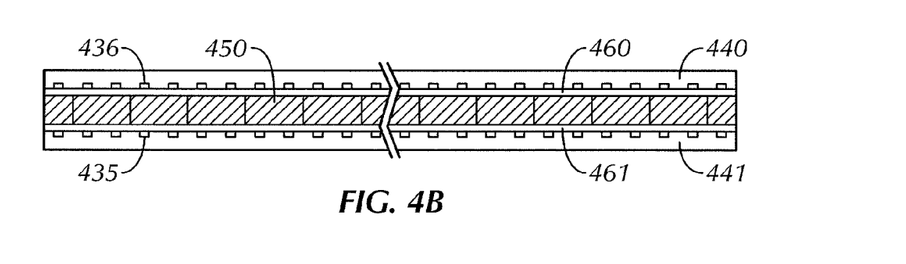

FIG. 4B shows an end-on cross-sectional view of gap control layer 426. As shown in FIG. 4B, elastomeric layers 440 and 441 may contain parallel fibers 450 which may be supported and reinforced by woven fibers 435 and 436 and cross-knitting 460 and 461.

Figure 4C:
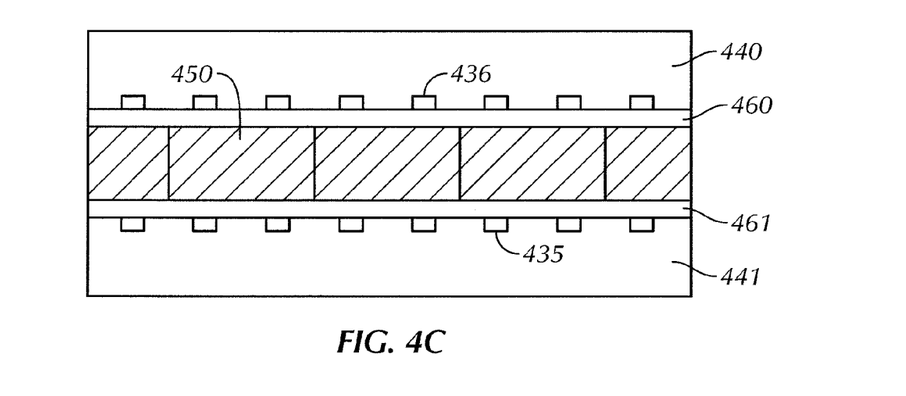
FIG. 4C is a blown up cross-sectional view of a gap control layer in accordance with one or more embodiments of the present disclosure.

FIG. 4C shows a blown-up detail of the end-on view shown in FIG. 4B. Fibers 450 may be contained and aligned with cross-knitting 460 and 461. Cross-knitting 460 may provide a top support and cross-knitting 460 may provide a bottom support to the fibers 450 and to gap control layer 426 or may be woven within gap control layer 426.

Although shown as reinforcement fibers, fibers 450 may be individual fibers, woven bundles, and/or other fibrous structures. Similarly, cross-knitting 460 and 461, and woven fibers 435 and 436, may be single fibers, bundles, woven bundles, and/or any other fiber and/or fiber structure that may provide support and/or reinforcement to gap control layer 426. Furthermore, although fibers 450 are shown in FIG. 4B as a particular orientation, fibers 450 may be in a different orientation, such as perpendicular to that shown in FIG. 4B, or may be in a matrix form, such that FIG. 4B may represent a side cross-sectional view as well. Accordingly, variations in fibers 450, cross-knitting 460 and 461, and/or woven fibers 435 and 436 may be applied and/or employed without deviating from the scope of the present disclosure.

Gap control layer 426 may be 0.05 inches thick, thereby allowing only a very slight increase in the size of the pipe, but allowing for an effective control over the gaps between adjacent wrappings. However, this thickness is for example only and those skilled in the art will appreciate that the thickness of gap control layer 426 may vary in thickness without deviating from the scope of the present disclosure.

Displacement of the gap control layer between adjacent wrappings of a superimposed layer will be discussed with reference to FIG. 5. Specifically, the anti-extrusion layer may include a lower anti-extrusion surface 541, an upper anti-extrusion surface 540, and reinforcement fiber bundles 550. Reinforcement fiber bundles 550 may be further supported by cross-knitting 560 and 561 and woven fibers 535 and 536. Hoop strength wraps 504 may be helically wound around the anti-extrusion layer. Gaps 528 may form between adjacent wraps 504. Prior to installation of wraps 504, upper anti-extrusion surface 540 may be represented by dashed line 555. However, after installation of wraps 504, upper anti-extrusion surface 540 may deform. The deformation of upper anti-extrusion surface 540 is shown by a decrease in thickness below each wrapping 504 and an increase in thickness in gaps 528 between each set of adjacent wrappings 504. Accordingly, filler 524 may form as a gap controller, preventing wraps 504 from shifting or moving relative to the other wraps 504 or relative to a fluid barrier upon which the anti-extrusion layer may be applied. Alternatively, deformation of upper anti-extrusion surface 540 may be caused by application of a force and/or pressure 570 from beneath the lower anti-extrusion layer 541.

Accordingly, in accordance with one or more embodiments of the present disclosure the deformation of upper anti-extrusion surface 540 may occur during factory acceptance hydrostatic pressure testing of the pipe. For example, when internal pressure 570 may be applied to the pipe, the liner 541 may be forced radially outward (upward in FIG. 5) toward hoop strength wraps 504, thus squeezing filler 524 from beneath hoop strength wraps 504 into gaps 528.

Figure 6:
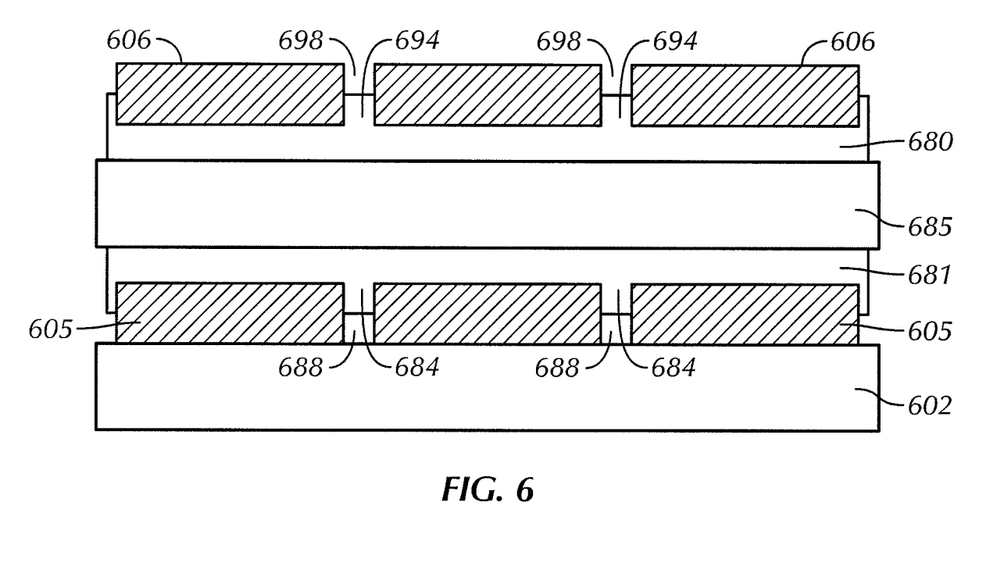
FIG. 6 is a cross-section view of a portion of a composite flexible pipe in accordance with one or more embodiments of the present disclosure.

Now, referring to FIG. 6, a cross section view of a portion of a composite flexible pipe in accordance with one or more embodiments of the present disclosure is shown. Particularly, FIG. 6 shows a cross section of a free venting pipe. For example, a free venting pipe as disclosed in U.S. Patent Application Publication No. 2008/0145583 may incorporate aspects of the present disclosure.

Specifically, with reference to FIG. 6, anti-extrusion layers 680 and 681, in accordance with one or more embodiments as described above, may be applied during manufacture of a free venting pipe. A free venting pipe may include a perforated core 602, an internal hoop layer 605, an inner anti-extrusion layer 680, a membrane 685, an outer anti-extrusion layer 681, and an external hoop layer 606. Internal hoop layer 605 may provide collapse resistance, and external hoop layer 606 may provide internal pressure resistance. Additional layers such as those discussed above, including anti-wear layers, tensile layers, and jackets, may be provided without deviating from the scope of the present disclosure.

In a pipe as shown in FIG. 6, gaps 688 and 698 may be present between adjacent wraps of hoop layers 605 and 606, respectively. Anti-extrusion layers 680 and 681 may be applied between the hoop layers 605 and 606 and membrane 685. In accordance with embodiments of the present disclosure, gaps 688 and 698 may be controlled by fillers 684 and 694, respectively.

Accordingly, anti-extrusion layers may be applied between reinforcement layers and membrane layers, to thereby control gaps in the reinforcement layers. Therefore, gap control may be achieved in an internal reinforcement layer, in addition to achieving gap control in an external reinforcement layer. As such, there may be two or more anti-extrusion layers with filler for gap control, and, particularly, on either side of a membrane.

Further, in accordance with one or more embodiments of the present disclosure, an anti-extrusion layer with bedding may be applied externally to a hoop strength reinforcement layer. The anti-extrusion layer control may potentially be improved if application of the anti-extrusion layer is made both internally and externally to a hoop strength layer, thereby allowing gap control from both sides of the hoop strength layer. Alternatively, an anti-extrusion layer with bedding may only be applied to the external surface of the hoop strength layer. For example, referring again to FIG. 3, anti-extrusion layer 326 may be applied above hoop strength wraps 304, instead of, or in addition to being applied between hoop strength wraps 304 and fluid barrier 302. The anti-extrusion layer may be applied with sufficient tension so that fillers 324 may form between wraps 304 and into gaps 328.

Advantageously, gap control in accordance with one or more embodiments of the present disclosure may provide minimum requirements to prevent blow through. According to the American Petroleum Institute Specification 17J, Table 6, "the maximum allowable reduction in wall thickness (of the internal pressure sheath) below the minimum design value due to creep in(to) the supporting structural layers shall be 30% under all load combinations." Although this requirement is for conventional flexible pipe, the requirement also applies to flexible fiber reinforced pipe, and is a requirement to prevent blow through of a fluid barrier, internal pressure sheath, or liner. Gap control in accordance with one or more embodiments of present disclosure may provide fillers which may prevent slip between adjacent wrappings of a hoop strength layer while maintaining a minimum of less than 30% thickness reduction.

Moreover, reinforcement layers may be wound at any lay angle relative to the fluid barrier, where a high lay angle may provide hoop strength and low lay angles may provide axial strength. In some embodiments of flexible fiber reinforced pipe, the innermost structural reinforcement layer may be applied at an approximately 40° to 60° lay angle to the pipe axis. Thus, when the pipe bends, any gaps that may exist between adjacent wrappings may not open significantly. However, in accordance with one or more embodiments of the present disclosure, hoop reinforcement layers (i.e., 104, 204, 304, and 504 of FIGS. 1, 2, 3, and 5, respectively) may be wound at a relatively high lay angle relative to the longitudinal axis of the pipe (i.e., 60° to 89°) to provide internal pressure resistance against burst and/or external pressure resistance against collapse. Therefore, one or more embodiments of the present disclosure may allow for a higher lay angle, thereby allowing hoop strength reinforcement instead of axial strength reinforcement.

Moreover, one or more embodiments of the present disclosure may provide control over the gaps between adjacent wrappings of a structural layer so as to prevent blow through of a fluid barrier or other layer beneath the gap control layer. Accordingly, fewer wrappings and/or applications of anti-extrusion layers may be allowed, thereby increasing the efficiency with which flexible pipes may be made. Further, fewer wrappings and/or applications may reduce the pipe diameter, reducing costs and weight.

Moreover, one or more embodiments of the present disclosure may allow a first reinforcement layer above a fluid barrier to be applied at a high lay angle, thus providing more hoop than axial strength. Accordingly, the innermost structural support layer may be a hoop strength layer, and therefore may provide burst and/or collapse resistance. Further, embodiments described herein may require less material than traditional flexible pipe, as a hoop strength layer may be applied at a smaller diameter. Further, the reinforcement may also prove a relatively "soft" layer onto which a hoop resistant layer may be applied.

Moreover, one or more embodiments of the present disclosure may provide reinforcement to a fluid barrier so as to prevent blow through. In accordance with one or more embodiments of the present disclosure, the gap control layer, which may be an anti-extrusion layer, may be applied as a single tape layer, sleeve, or extrusion, or may be applied as multiple tape layers, sleeves, and/or extrusions, or combinations thereof. Accordingly, the efficiency with which gap control may be applied may be improved.

Moreover, gap control provided by one or more embodiments of the present disclosure may be used with pipes employing internal carcass designs, free venting designs, standard annulus designs, and/or any other pipe designs where gap control may be desired, including non-interlocking steel pipe layers. Additionally, gap control layers in accordance with one or more embodiments described herein may be provided between any two consecutively wrapped layers of a pipe.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A tubular assembly comprising:
   a fluid barrier;
   a first layer; and
   a second layer comprising a plurality of non-interlocking helical wraps and disposed on an outer surface of the first layer,
   wherein the first layer is disposed between the fluid barrier and the second layer and configured to at least partially displace into a space created between adjacent non-interlocking helical wraps of the second layer,
   wherein the fluid barrier layer, the first layer, and the second layer are unbonded to one another.

2. The tubular assembly of claim 1, wherein the first layer comprises a bedding layer.

3. The tubular assembly of claim 2, wherein the first layer comprises an anti-extrusion layer.

4. The tubular assembly of claim 3, wherein the anti-extrusion layer and the bedding layer comprise a single tape and the bedding layer comprises a surface of the single bonded tape.

5. The tubular assembly of claim 3, wherein the anti-extrusion layer and the bedding layer comprise separate tapes.

6. The tubular assembly of claim 2, wherein the bedding layer comprises an elastomer.

7. The tubular assembly of claim 6, wherein the elastomer comprises reinforced elastomer.

8. The tubular assembly of claim 1, wherein the second layer comprises a load resisting layer.

9. The tubular assembly of claim 8, wherein the load resisting layer comprises a steel hoop layer.

10. The tubular assembly of claim 8, wherein the load resisting layer comprises a composite hoop layer.

11. The tubular assembly of claim 8, wherein the load resisting layer resists external pressure loads.

12. The tubular assembly of claim 8, wherein the load resisting layer resists internal pressure loads.

13. The tubular assembly of claim 1, further comprising:
   an inner tensile layer disposed external to the second layer;
   an outer tensile layer disposed external to the inner tensile layer; and
   a jacket disposed external to the outer tensile layer.

14. The tubular assembly of claim 1, wherein the first layer comprises:
   a first tape layer; and
   a second tape layer,
   wherein the second tape layer is disposed on an outer surface of the first tape layer.

15. The tubular assembly of claim 14, wherein at least one of the first tape layer and the second tape layer comprise anti-extrusion tape.

16. The tubular assembly of claim 1, wherein the first layer comprises fillers which displace radially outward from the outer surface of the first layer into the space between the adjacent non-interlocking helical wraps of the second layer.

17. A flexible pipe comprising:
   a fluid barrier layer;
   a hoop strength layer with non-interlocking helical wraps;
   a bedding layer between the fluid barrier and hoop strength layer that reduces in thickness under the hoop strength layer and increases in thickness in gaps between the non-interlocking helical wraps during manufacturing, testing or operating the flexible pipe,
   wherein the fluid barrier layer, the hoop strength layer, and the bedding layer are unbonded to one another.

18. The flexible pipe in claim 17, further comprising:
   an anti-extrusion layer between the fluid barrier and hoop strength layer that resists extrusion of the fluid barrier into the gaps between the non-interlocking helical wraps.

19. The flexible pipe of claim 18, wherein the anti-extrusion layer and bedding layer comprise a single layer.

20. The flexible pipe of claim 19, wherein the single layer comprises a helically applied tape wrap.

* * * * *